(12) United States Patent
Liu et al.

(10) Patent No.: US 7,479,785 B2
(45) Date of Patent: Jan. 20, 2009

(54) CONTROL AND TESTING OF A MICRO ELECTROMECHANICAL SWITCH

(75) Inventors: Lianjun Liu, Chandler, AZ (US); Bishnu P. Gogoi, Scottsdale, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 233 days.

(21) Appl. No.: 11/465,311

(22) Filed: Aug. 17, 2006

(65) Prior Publication Data

US 2008/0043523 A1 Feb. 21, 2008

(51) Int. Cl.
*G01R 31/00* (2006.01)
(52) U.S. Cl. .................. 324/415; 324/457; 324/658
(58) Field of Classification Search .......... 324/415, 324/457, 658, 76.11
See application file for complete search history.

(56) References Cited

U.S. PATENT DOCUMENTS

| | | | |
|---|---|---|---|
| 5,578,976 A | 11/1996 | Yao | |
| 6,307,169 B1 | 10/2001 | Sun et al. | |
| 6,307,452 B1 | 10/2001 | Sun | |
| 6,384,353 B1 | 5/2002 | Huang et al. | |
| 6,507,475 B1 | 1/2003 | Sun | |
| 6,706,548 B2 | 3/2004 | Liu | |
| 6,744,264 B2 | 6/2004 | Gogoi et al. | |
| 6,794,101 B2 | 9/2004 | Liu et al. | |
| 2004/0036558 A1* | 2/2004 | Allison et al. | 333/205 |
| 2004/0070400 A1 | 4/2004 | van Spengen | |

OTHER PUBLICATIONS

Sood et al; "Piezoelectric Micro power Generator for Energy Harvesting"; Department of Mechanical Engineering Massachusetts Institute of Technology, Cambridge, MA, Aug. 17, 2008.
Ll et al; "Vibration Control of a PZT Actuated Suspension Dual-Stage Servo System Using a PZT Sensor"; IEEE Transactions on Magnetics, vol. 39, No. 2, Mar. 2003.

* cited by examiner

*Primary Examiner*—Vincent Q Nguyen
(74) *Attorney, Agent, or Firm*—Daniel D. Hill

(57) ABSTRACT

A circuit includes a micro electro mechanical switch and a detection circuit. The micro electro mechanical switch has a movable portion positioned to form an electrical connection between a first electrical contact and a second electrical contact in response to an electrostatic force provided by a top activation electrode and a bottom activation electrode. The detection circuit is electrically coupled to the top and bottom activation electrodes and is for detecting a first capacitance value between the top and bottom activation electrodes when the movable portion is in a first position and for detecting a second capacitance value when the movable portion is in a second position. By detecting a change in the capacitance, it can be determined if the switch is open or closed.

20 Claims, 5 Drawing Sheets

CONTROL AND TESTING OF A MICRO ELECTROMECHANICAL SWITCH

CROSS-REFERENCE TO RELATED APPLICATIONS

The present application is related to a commonly assigned, co-pending application by LianjunLiu et al. entitled, "Control and Testing of a Micro Electromechanical Switch Having a Piezo Element", application Ser. No. 11/465,319, and filed concurrently herewith.

The present application is related to a commonly assigned, co-pending application by Lianjun Liu entitled, "Piezoelectric MEMS Switches and Method For Making", having application Ser. No. 11/363,791, and filed on Feb. 28, 2006.

FIELD OF THE INVENTION

The present invention relates generally to micro electromechanical systems (MEMS), and more particularly, to control and testing of a micro electromechanical switch.

RELATED ART

Micro electromechanical switches can be used in telecommunications systems to switch radio frequency (RF) signals. It is important for the MEMS switches to function reliably. A MEMS switch may fail closed, for example, due to stiction. A micro electromechanical switch may be used to couple an RF transmitter and a receiver to an antenna. A first switch is used to couple the receiver to the antenna while a second switch is used to coupled the transmitter to the antenna. Generally only the transmitter or the receiver can be coupled to the antenna at one time. If the first switch between the receiver and the antenna failed in the closed position when the second switch is closed, RF power from the transmitter may be fed into the receiver, causing serious damage. Therefore, it would be desirable to be able to detect when a MEMS switch fails to operate.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the disclosure.

DETAILED DESCRIPTION OF THE DRAWINGS

Generally, the present invention provides a switch status detection circuit for a micro electro mechanical switch, and a method for controlling and testing the switch. The detection circuit is electrically coupled to top and bottom activation electrodes of the switch and detects if the switch is open or closed, in one embodiment, by combining a capacitance value between the top and bottom activation electrodes with a reference capacitance value. In another embodiment, the activation electrode capacitance value is compared to a reference capacitance value. By using the detection circuit to sense whether the switch is open or closed, failure of the switch can be discovered. Also, the detection circuit can be used to "self-test" the switch during power-up of a device, or between mode or frequency band switching. In addition, using the activation plates to detect whether the switch is open or closed as illustrated does not interfere with normal operation of switch.

Figure 1:
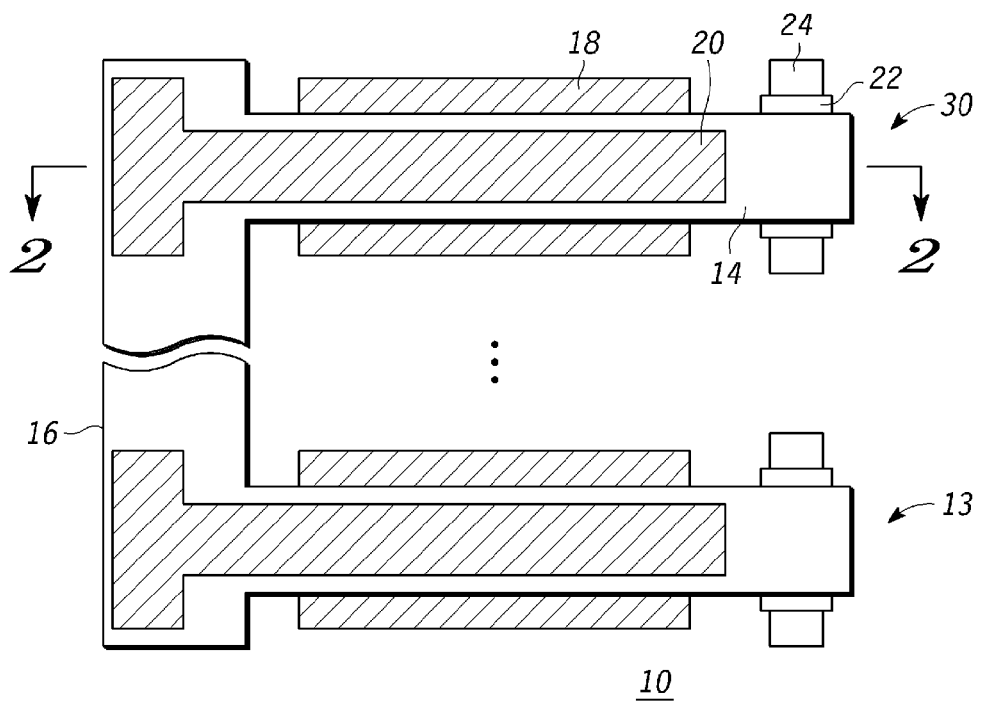
FIG. 1 illustrates a top plan view of a multiple throw MEMS switch in accordance with an embodiment of the present invention.
Figure 2:
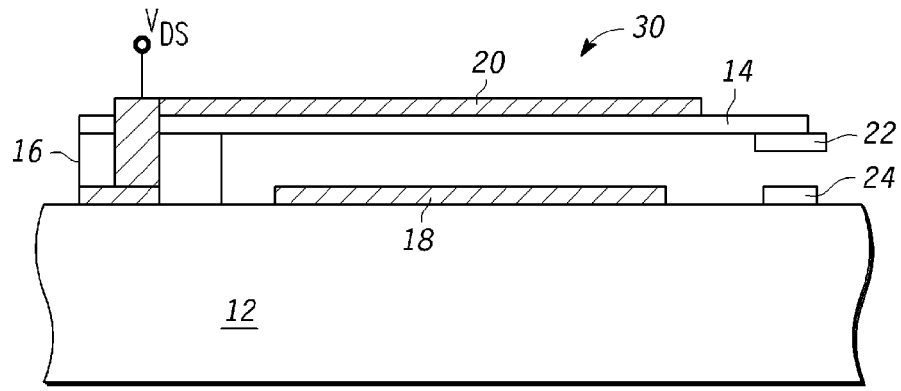
FIG. 2 illustrates a cross-sectional view taken along the line 2-2 of a portion of the switch of FIG. 1 with the contacts open.

FIG. 1 illustrates a top plan view of a multiple tap MEMS switch 10 in accordance with an embodiment of the present invention. The multiple tap MEMS switch 10 is also known as a multiple throw switch. Multiple-tap switch 10 includes a plurality of switches having one end coupled together. Each switch of the plurality of switches is substantially identical and is represented by switch 13 and switch 30. A cross-sectional view of switch 30, taken along line 2-2 in FIG. 1, is illustrated in FIG. 2. In FIG. 2 switch 30 is illustrated with contacts 22 and 24 in the open position and in FIG. 3 switch 30 is illustrated with contacts 22 and 24 closed.

Figure 3:
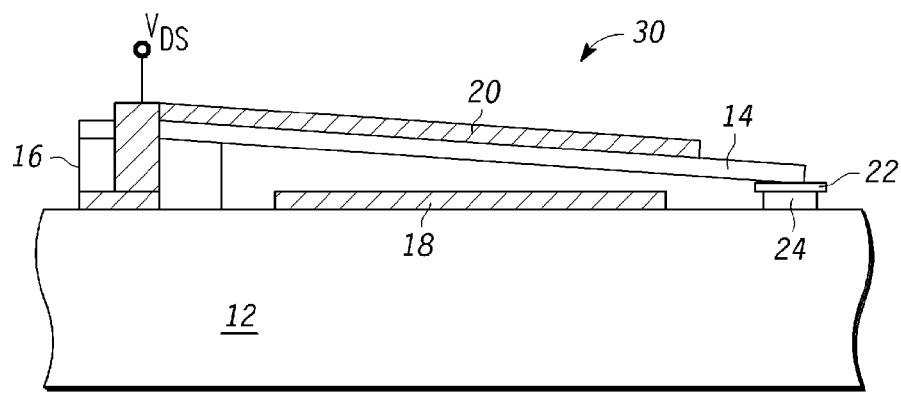
FIG. 3 illustrates a cross-sectional view taken along the line 2-2 of the switch of FIG. 2 with the contacts closed.

Referring to FIGS. 1-3, switch 30 is a cantilever type switch and is formed using conventional manufacturing techniques on a substrate 12. Switch 30 includes a movable portion 14, a support structure 16, a bottom activation electrode 18, a top activation electrode 20, a first electrical contact 22 and a second electrical contact 24. The substrate 12 is a silicon substrate in the illustrated embodiment but in other embodiments the substrate 12 may be formed from, for example, Gallium Arsenide, ceramics, or glass. Movable portion 14 is a cantilever beam having one end attached to the support structure 16 and the other end positioned above the substrate 12. The cantilever beam may include a hinge or flexible portion to allow the electrical contact 22 to move down and make physical contact with the electrical contact 24 as illustrated in FIG. 3. When a driver voltage is applied, the top activation electrode 20 and the bottom activation electrode 18 function to electrostatically close the switch causing contact 22 to make an electrical connection with contact 24. When the driver voltage is removed, the movable portion 14 returns to the open position as illustrated in FIG. 2. Electrical conductors (not shown) may be connected to contact 22 through movable portion 14 and to contact 24 for using switch 30 in an electrical or electronic circuit.

The activation plates 18 and 20 form a capacitor. The distance between the activation plates determines a capacitance value between the plates. For example, when the switch 30 is open, the capacitor formed by the activation plates 18 and 20 has one capacitance value. When the switch is closed, the plates 18 and 20 are closer together (see FIG. 3) and produce a larger capacitance value. This difference in capacitance is used to detect if the switch contacts are open or closed.

Figure 4:
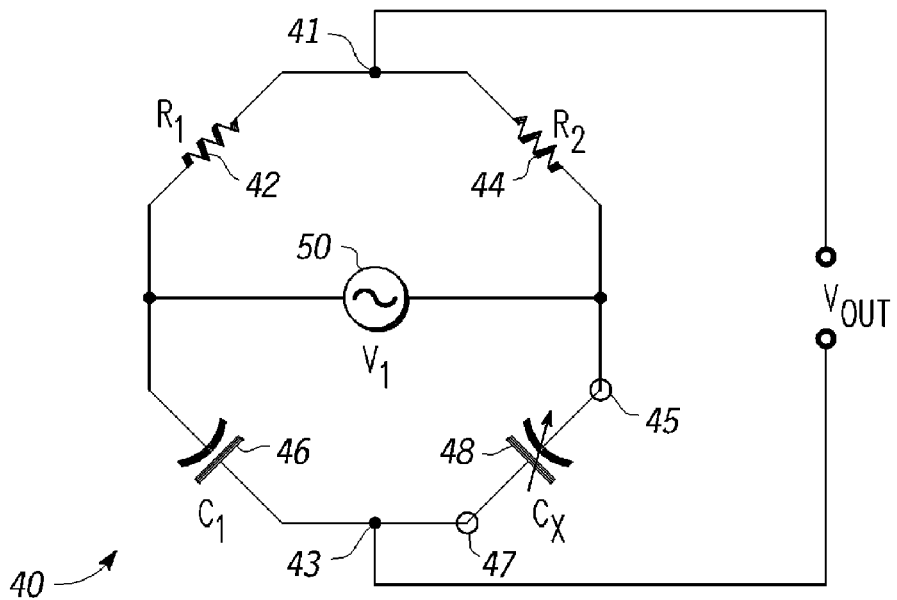
FIG. 4 illustrates, in schematic diagram form, a detection circuit in accordance with an embodiment of the disclosure.

FIG. 4 illustrates, in schematic diagram form, a detection circuit 40. Detection circuit 40 is used to determine if a micro electro mechanical switch such as switch 30 is open or closed. Detection circuit 40 includes resistors 42 and 44, capacitor 46 and signal source 50. Resistor 42 has a first terminal coupled to a first output terminal 41, and a second terminal. Resistor 44 has a first terminal coupled to the first terminal of resistor 42, and a second terminal coupled to activation electrode terminal 45. Capacitor 46 has a first plate electrode coupled to the second terminal of the resistor 42, and a second plate electrode coupled to both second output terminal 43 and to activation electrode terminal 47. Signal source 50 has a first output terminal coupled to the second terminal of resistor 42, and a second output terminal coupled to the second terminal of the resistor 44. Signal source 50 provides a time varying, or AC signal labeled "$V_1$". In the illustrated embodiment, V1 is a sine wave. Resistor 42 has a resistance value labeled "$R_1$", and resistor 44 has a resistance value labeled "$R_2$". The first and second output terminals provide a voltage labeled "$V_{OUT}$". Capacitor 46 has a capacitance value labeled "$C_1$". The activation plates 18 and 20 of switch 30 form a capacitor 48 having a capacitance value labeled "$C_X$". One of the activation plates 18 or 20 is coupled to terminal 45 and the other of activation plates 18 or 20 is coupled to terminal 47. In detection circuit 40, Capacitance value $C_X$ is combined with capacitance value $C_1$ so that when the ratio $R_1/R_2=C_X/C_1$ then $V_{OUT}=0$.

In the illustrated embodiment, capacitance value $C_1$ is chosen so that $V_{OUT}=0$ when the switch is open. Therefore, when switch 30 closes, $C_X$ becomes larger; capacitance ratio $C_X/C_1$ also becomes larger, causing $V_{OUT}$ to be non-zero.

Because the activation voltage (not shown) that is applied to the activation electrodes to generate the electrostatic forces is DC, and the signal V1 is AC, detection circuit 40 can function at the same time the switch is in operation without affecting the operation of the switch. Also, in the illustrated embodiment, detection circuit 40 is preferably implemented on the same substrate as switch 30. This minimizes undesirable parasitic effects from, for example, long conductors such as wire bonds and board traces. However, in other embodiments detection circuit 40 may be implemented on another substrate.

Figure 5:
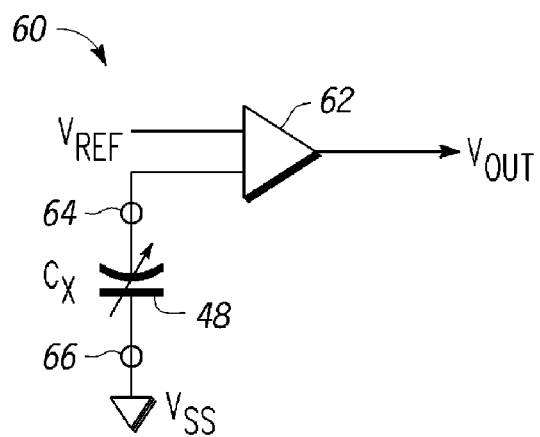
FIG. 5 illustrates, in schematic diagram form, a detection circuit in accordance with another embodiment of the disclosure.

FIG. 5 illustrates, in schematic diagram form, a detection circuit 60 for determining if switch 30 is open or closed. Detection circuit 60 includes amplifier 62. Amplifier 62 has a first input for receiving a reference voltage labeled "$V_{REF}$", a second input coupled to a terminal 64, and an output for providing an output voltage labeled "$V_{OUT}$". The capacitor 48, formed by the activation electrodes 18 and 20 is coupled between the terminal 64 and a terminal 66. The terminal 66 is coupled to a power supply voltage terminal labeled "$V_{SS}$". In the illustrated embodiment, $V_{SS}$ is coupled to ground. In another embodiment, $V_{SS}$ may be a different power supply voltage. When the switch 30 opens and closes the capacitance value $C_X$ changes from a low value to a high value. A corresponding voltage change is provided to the second input of amplifier 62. The reference voltage $V_{REF}$ is chosen to be between the high and low voltage provided at the second input of amplifier 62. Amplifier 62 compares the voltage at terminal 64 to $V_{REF}$, the voltage $V_{OUT}$ is determined as a result of the comparison. For example, if the voltage at terminal 64 is higher than $V_{REF}$, then $V_{OUT}$ may correspond to a logic one indicating that switch 30 is closed. If the voltage at terminal 64 is lower than $V_{REF}$, then $V_{OUT}$ may correspond to a logic zero, indicating that switch 30 is open.

Like detection circuit 40, detection circuit 60 is preferably implemented on the same substrate as switch 30. This minimizes undesirable parasitic effects from, for example, long conductors such as wire bonds and board traces. However, in other embodiments detection circuit 60 may be implemented on another substrate.

Figure 6:
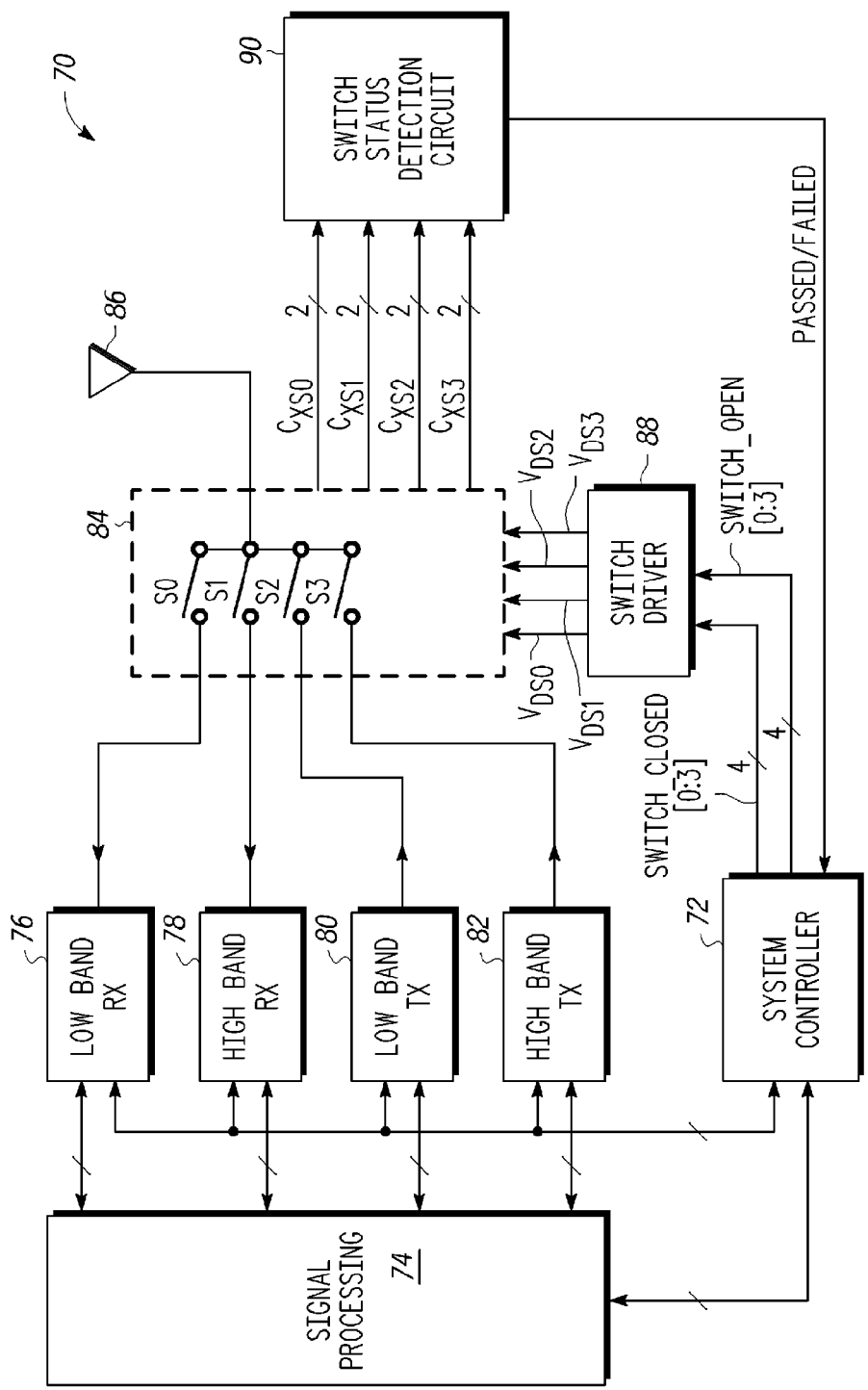
FIG. 6 illustrates, in block diagram form, a communications system having MEMS switches in accordance with an embodiment of the disclosure.

FIG. 6 illustrates, in block diagram form, communications system 70. Communications system 70 is a simplified embodiment of a multi-band RF transceiver, such as for example, an RF transceiver for use in a multi-band cellular telephone handset. Communications system 70 includes system controller 72, signal processor 74, low band RF receiver circuit 76, high band RF receiver circuit 78, low band RF transmitter 80, high band RF transmitter 82, multiple-tap switch 84, antenna 86, switch driver 88, and switch status detection circuit 90.

System controller 72 controls and coordinates the operation of signal processor 74, receivers 76 and 78, transmitters 80 and 82, and switch driver 88. System controller 72 is bi-directionally coupled to processor 74, receivers 76 and 78, and transmitters 80 and 82 for sending and receiving control information. System controller 72 also has an output coupled to an input of switch driver circuit 88 for providing a plurality of control signals labeled "SWITCH CLOSED [0:3]", an output coupled to an input of switch driver circuit 88 for providing a plurality of control signals labeled "SWITCH OPEN [0:3]", and an input for receiving a control signal from switch status detection circuit 90 labeled "PASSED/FAILED".

Processor 74 primarily processes data signals that are received from receivers 76 and 78, and prepares data for transmission by transmitters 80 and 82. Processor 74 is bi-directionally coupled to receivers 76 and 78 for receiving the data and for sending and receiving control information. Likewise, processor 74 is bi-directionally coupled to transmitters 80 and 82 for sending the data and for sending and receiving control information.

Multiple-tap switch 84 includes 4 micro electro mechanical switches labeled "S0" through "S3". Multiple-tap switch 84 is functionally similar to multiple-tap switch 10 illustrated in FIG. 1 and discussed above. However, in other embodiments, multiple-tap switch 84 may be different. One terminal of each of the switches S0-S3 is coupled together and to antenna 86, and the other terminal is coupled to one of the transmitters or receivers as illustrated in FIG. 6. In the illustrated embodiment, only one of switches S0-S3 can be closed at one time. Switch driver 88 is coupled to multiple-tap switch 84 and provides driver voltages labeled "$V_{DS0}$", "$V_{DS1}$", "$V_{DS2}$", and "$V_{DS3}$" to control activation of each of the switches S0-S3 in response to a corresponding SWITCH OPEN [0:3] or SWITCH CLOSED [0:3] control signal from system controller 72. Switch status detection circuit 90 includes a plurality of inputs labeled "$C_{XS0}$" through "$C_{XS3}$" for receiving the capacitance values for each of the activation plates of switches S0 to S3. For example, the activation plates of switch S0 have the capacitance value $C_{XS0}$. When a switch is detected as open or closed, the information is provided to system controller 72 as signal PASSED/FAILED. In the illustrated embodiment, switch status detection circuit 90 includes one of either detection circuit 40 (FIG. 4) or detection circuit 60 (FIG. 5). Also, the switch status detection circuit includes additional logic and buffer circuits (not shown) to convert the output voltage $V_{OUT}$ provided by, for example, detection circuit 40, to a form that can be used by system controller 72.

As an example, during operation of communication system 70, switch S0 is closed, coupling the antenna 86 to low band receiver 76 to receive data. The other switches S1-S3 are open. When communication system 70 is required to transmit data using low band transmitter 80, system controller 72 will first assert control signal SWITCH OPEN 0 to cause switch S0 to open. Switch status detection circuit 90 will detect if switch S0 opened and assert the appropriate PASSED/FAILED indication to system controller 72. System controller 72 can then assert control signal SWITCH CLOSED 2 to direct switch driver 88 to provide drive voltage $V_{DS2}$ to cause switch S2 to close, thus connecting low band transmitter 80 to antenna 86.

Figure 7:
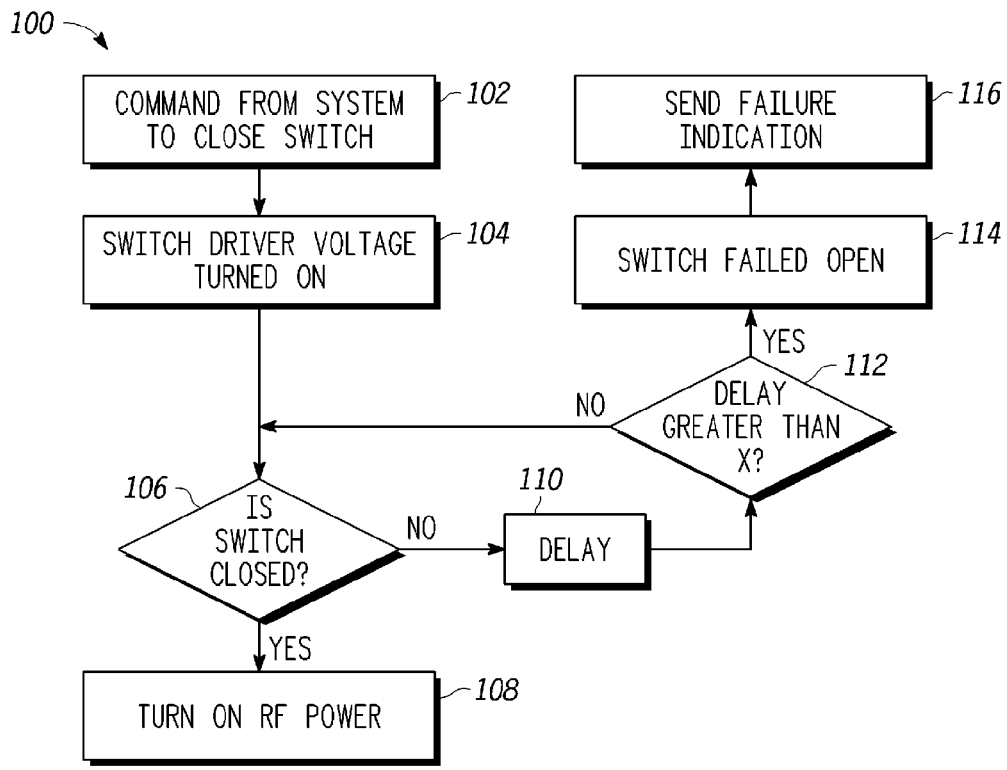
FIG. 7 is a flow chart for illustrating a method to close a MEMS switch in accordance with an embodiment of the disclosure.

FIG. 7 is a flow chart for illustrating a method 100 for closing a MEMS switch in a system in accordance with one embodiment. Referring to both FIG. 6 and FIG. 7, at step 102 a command to close a switch is provided by a system controller, such as system controller 72. At step 104, the command is received by a switch driver circuit, such as switch driver circuit 88. The switch driver provides a drive voltage to close the switch. At decision step 106, it is determined if the switch is closed. If the detection circuit, such as detection circuit 90, determines that the switch closed, then the YES path is taken to step 108 and RF power is turned on and conducted through the switch. However, if the switch did not close, the NO path is taken to step 110 where an incremental delay is applied. After the incremental delay at decision step 112, it is determined if the total accumulated delay is greater than a predetermined delay period "X". The delay X may be a predetermined multiple of the incremental step 110 delay. If at decision step 112 the accumulated total delay is less than the predetermined delay X, the detection circuit checks the status of the switch by looping around the NO path from decision step 112 to decision step 106 and back to decision step 112. The incremental delay at step 110 is added to the total delay at step 112. If the switch closes before the end of the predetermined delay X, then the YES path is taken from step 106 to step 108 and RF power is turned on. However, if the switch fails to close before the end of the predetermined delay X, the YES path is taken from decision step 112 to step 114. At step 114, the switch is determined to be failed open, and at decision step 116, a failure indication is sent from the detection circuit to the system controller.

Figure 8:
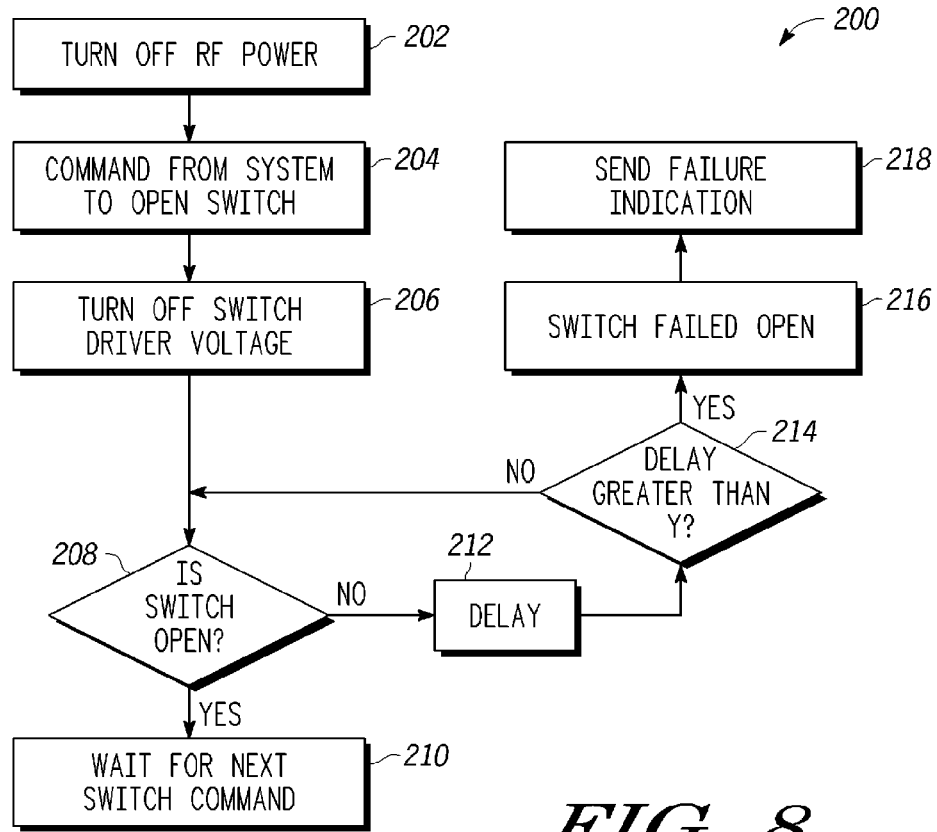
FIG. 8 is a flow chart for illustrating a method to open a MEMS switch in accordance with an embodiment of the disclosure.

FIG. 8 is a flow chart for illustrating a method 200 for opening a MEMS switch. Referring to both FIG. 6 and FIG. 8, at step 202 the RF power is turned off, if necessary. At step 204, a command to open a switch is provided by the system controller to the switch driver. At step 206, the switch driver then turns off the driver voltage that holds the switch closed, allowing the switch to open. At decision step 208, the detection circuit, such as detection circuit 40, determines if the switch is open. If the switch is open, the YES path is taken from step 208 to step 210, and the switch driver circuit and detection circuit wait until the next switch activation command. However, if at step 208 it is determined that the switch is still closed, the NO path is taken from step 208 to delay step 212. As discussed above regarding the method 100 of FIG. 7, the step 212 delay is an incremental delay that is accumulated to provide an accumulated delay. At decision step 214, it is determined if the accumulated delay is greater than a predetermined delay "Y". If the delay is less than the delay Y, the NO path is taken back to step 208. If the switch is detected as open, then the YES path is taken from step 208 to step 210. If the switch is still detected as closed, the method loops around delay step 212, decision step 214, and decision step 208 until the accumulated delay is greater than delay Y. If the accumulated delay is greater than delay Y then the YES path is taken from step 214 to step 216. At step 216 the switch is determined to have failed open and a failure indication is sent at step 218.

Figure 9:
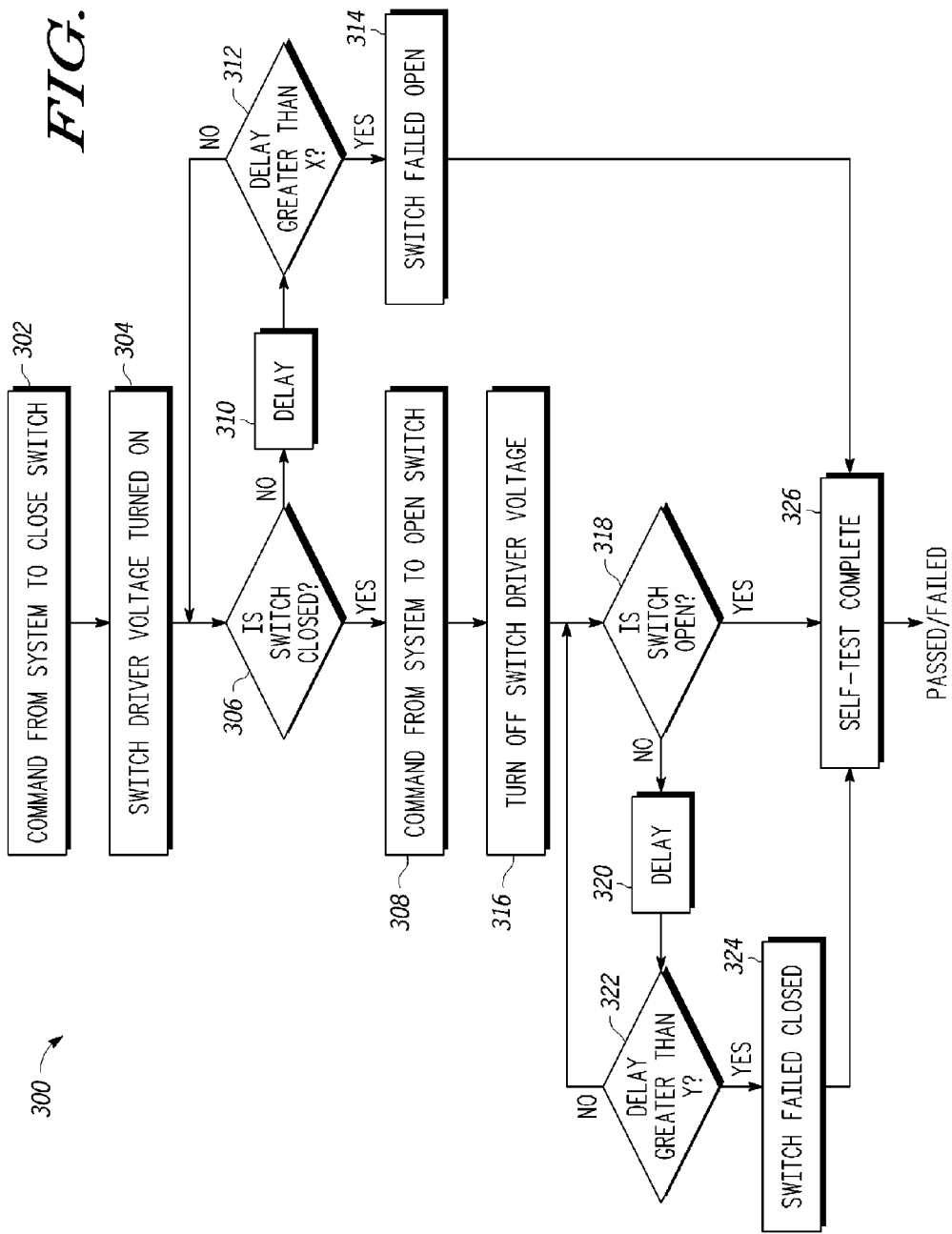
FIG. 9 is a flow chart for illustrating a method to test a MEMS switch in accordance with an embodiment of the disclosure.

FIG. 9 is a flow chart for illustrating a method 300 for testing a MEMS switch at power up, during mode switching, or during manufacturing. Referring to both FIG. 6 and FIG. 7, at step 302 a command to close a switch is provided by a system controller, such as system controller 72. At step 304, the command is received by a switch driver circuit, such as switch driver circuit 88. The switch driver provides a drive voltage to close the switch. At decision step 306, it is determined if the switch is closed. If the detection circuit, such as detection circuit 90, determines that the switch closed, then the YES path is taken to step 308. If at step 306 it is determined that the switch is closed, the NO path is taken to step 310 and an incremental delay is applied to an accumulated delay. At step 312, it is determined if the accumulated delay is greater than a predetermined delay X. If the accumulated delay is less than delay X, the method loop around steps 306, 310, and 312 until either the switch is detected to be closed, or the delay is determined to be greater than delay X at step 312. If the delay is greater than delay X and the switch is still open, the YES path is taken from step 312 to step 314. At step 314 the switch is determined to have failed. A step 326, the self-test is complete and a negative pass/fail indication is provided.

Referring back to step 306, if the switch is determined to have closed, the YES path is taken to step 308 and a command is provided by the system controller to open the switch. At step 316, the switch driver circuit turns off the driver voltage to the activation electrodes of the switch and the switch is suppose to open. At decision step 318, it is determined if the switch opened. If the switch opened the YES path is taken from step 318 to step 326 and the passed indication is provided. If the switch is not detected as opened, the NO path is taken to step 320 and an incremental delay is applied to an accumulated delay. At step 322 it is determined if the accumulated delay is greater than a delay Y. If the accumulated delay is not greater than delay Y, then the NO path is taken to step 318. Step 318 is repeated via the loop around steps 320 and 322 until the accumulated delay is greater than delay Y. If the accumulated delay is greater than delay Y, the YES path is taken from step 322 to step 324 and the switch is determined to have failed closed. At step 326 a failed indication is provided.

The described embodiments provide a detection circuit and method for detecting that uses activation electrode capacitance to detect if a micro electro mechanical switch is closed or open. The use of the detection circuit allows for reliable "cold switching" of RF power. Also, the detection circuit and method provides for self-test functionality that can increase the reliability of a system having the detection circuit.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The terms a or an, as used herein, are defined as one or more than one. The terms including and/or having, as used herein, are defined as comprising (i.e., open language). As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A circuit comprising:
   a micro electromechanical switch having a movable portion positioned to form an electrical connection between a first electrical contact and a second electrical contact, a top activation electrode formed on the movable portion and a bottom activation electrode formed below the movable portion, the top and bottom activation electrodes forming a capacitor structure for electrostatically moving the movable portion in response to a driver voltage applied between the top and bottom activation electrodes; and
   a detection circuit, electrically coupled to the top and bottom activation electrodes, for detecting a first capacitance value between the top and bottom activation electrodes when the movable portion is in a first position and for detecting a second capacitance value when the movable portion is in a second position.

2. The circuit of claim 1, wherein the detection circuit provides a first output voltage when the movable portion is in the first position and provides a second output voltage when the movable portion is in the second position.

3. The circuit of claim 2, wherein the first position is when there is a closed circuit between the first and second electrical contacts, and the second position is when there is an open circuit between the first and second electrical contacts.

4. The circuit of claim 1, wherein the electromechanical switch and the switch status detection circuit are implemented on a semiconductor substrate.

5. The circuit of claim 1, wherein the detection circuit comprises:
   a first resistor having a first terminal coupled to a first output terminal, and a second terminal;
   a second resistor having a first terminal coupled to the first terminal of the first resistor, and a second terminal coupled to one of the top or bottom activation electrodes;
   a capacitor having a first plate electrode coupled to the second terminal of the first resistor, and a second plate electrode coupled to both a second output terminal and to the other of the top or bottom electrode; and
   a signal source having a first output terminal coupled to the second terminal of the first resistor, and a second output terminal coupled to the second terminal of the second resistor.

6. The circuit of claim 5, wherein the first and second output terminals for providing a first output voltage to a system controller to indicate when the micro electromechanical switch is closed and for providing a second output voltage to the system controller to indicate when the micro electromechanical switch is open.

7. The circuit of claim 1, wherein the detection circuit comprises an amplifier having a first input terminal for receiving a reference voltage, a second input terminal coupled to the top activation electrode, and an output terminal for providing a first output voltage corresponding to the first capacitance value when the switch is in the first position and for providing a second output voltage when the switch is in the second position.

8. The circuit of claim 1, further comprising a plurality of micro electromechanical switches, each of the plurality of micro electromechanical switches having top and bottom activation electrodes coupled to the detection circuit, and each of the plurality of micro electromechanical switches having first and second electrical contacts, the first electrical contacts of each of the plurality of electrical micro electromechanical switches coupled together, and each of the second electrical contacts for being coupled to a corresponding radio frequency (RF) circuit.

9. The circuit of claim 8, wherein the RF circuit includes one of an RF transmitter or an RF receiver.

10. A method for controlling a micro electromechanical switch having a movable portion positioned to form an electrical connection between a first electrical contact and a second electrical contact, a top activation electrode formed on the movable portion and a bottom activation electrode formed below the movable portion, the top and bottom activation electrodes forming a capacitor structure for electrostatically moving the movable portion in response to a driver voltage applied between the top and bottom activation electrodes, the method comprising:
    receiving a command from a control circuit to close the switch;
    applying the driver voltage to the switch; and
    detecting a capacitance value between the top and bottom activation electrodes to determine if the switch is closed.

11. The method of claim 10, wherein detecting a capacitance value further comprises:
    determining that the switch is open; and
    sending a switch failed indication to the control circuit.

12. The method of claim 11, wherein determining that the switch is open further comprises:
    delaying for a predetermined time period;
    determining that the switch is still open; and
    sending a switch failed indication to the control circuit.

13. The method of claim 10, wherein detecting a capacitance value further comprises determining that the switch is closed.

14. The method of claim 13, wherein after determining that the switch is closed, applying RF power through the switch.

15. The method of claim 13, further comprising:
    receiving a command from the control circuit to open the switch;
    removing the driver voltage from the switch;
    detecting a capacitance value between the top and bottom activation electrodes to determine if the switch is open;
    determining that the switch is open; and
    providing a switch passed indication to the control circuit.

16. A method for controlling a micro electromechanical switch having a movable portion positioned to form an electrical connection between a first electrical contact and a second electrical contact, a top activation electrode formed on the movable portion and a bottom activation electrode formed below the movable portion, the top and bottom activation electrodes forming a capacitor structure for electrostatically moving the movable portion in response to a driver voltage applied between the top and bottom activation electrodes, the method comprising:
    receiving a command from a control circuit to open the switch;
    removing the driver voltage from the switch; and
    detecting a capacitance value between the top and bottom activation electrodes to determine if the switch is open.

17. The method of claim 16, wherein detecting a capacitance value further comprises:
    determining that the switch is closed; and
    sending a switch failed indication to the control circuit.

18. The method of claim 17, wherein determining that the switch is closed further comprises:
  delaying for a predetermined time period;
  determining that the switch is still closed; and
  sending a switch failed indication to the control circuit.

19. The method of claim 16, wherein detecting a capacitance value further comprises:
  determining that the switch is open; and
  sending a switch passed indication to the control circuit.

20. The method of claim 16, wherein prior to receiving the command from the control circuit to open the switch, a radio frequency transmitter is turned off.

* * * * *